INVENTOR.
GEORGE F. METZ
BY Louis J. Knobbe
ATTORNEY

INVENTOR.
GEORGE F. METZ
BY Louis J. Knobbe
ATTORNEY

INVENTOR.
GEORGE F. METZ
BY Louis J. Knobbe
ATTORNEY

Nov. 9, 1965 G. F. METZ 3,217,293
DIGITAL COMPARATOR
Filed June 30, 1961 4 Sheets-Sheet 4

INVENTOR.
GEORGE F. METZ
BY Louis J. Knobbe
ATTORNEY 3,217,293
Patented Nov. 9, 1965

3,217,293

DIGITAL COMPARATOR

George F. Metz, Richmond, Calif., assignor to Beckman Instruments, Inc., a corporation of California Filed June 30, 1961, Ser. No. 121,044
5 Claims. (Cl. 340—146.2)

The present invention relates generally to digital comparator systems and, more particularly, to comparator systems which compare two numbers encoded in a predetermined binary code.

In many fields of contemporary endeavor, binary coded digital signals are employed for transmitting information. Representative examples include the digital voltmeters, EPUT (events per unit time) meters, time interval meters and gated counters manufactured and sold by Beckman Instruments, Inc., assignee of the present invention. A problem frequently encountered is that of comparing the value registered by such instruments with predetermined high and low reference values and determining whether the input value is within the reference limit values. Additional information which is often required resides in knowing whether or not the input value is greater than or equal to the high limit value or lower than or equal to the low limit value.

Several different binary codes are commonly used for encoding digital signals, representative examples including the pure binary code and the 8–4–2–1 and 4–2–2*–1 binary-coded-decimal codes. As a result, a digital comparator system must be adapted for receiving digital inputs in any one of several codes in order to provide maximum utility. Additional requirements for a preferred digital comparator include automatic operation from the time the input is applied thereto, a high speed of operation and a very high and preferably absolute accuracy.

It is the primary object of the present invention to provide an improved digital comparator which functions in accordance with the requirements enumerated above, i.e., an automatically operating digital comparator which provides a rapid identification of a binary coded digital input signal with absolute accuracy and which accepts inputs encoded in various binary encodings.

Other and further objects, features and advantages of the invention will become apparent as the description proceeds.

Briefly, in accordance with a preferred form of the present invention, there is provided a comparator which sequentially compares in order the highest to the lowest significant binary digits of the input signal with the respective highest to lowest significant binary digits of the predetermined low reference limit. The output of this comparator indicates whether the input value is equal to or greater than or less than the low reference value. A limit selector device responsively connected to the comparator is actuated upon an indication from the comparator that the input value is greater than the low reference value. The comparator device then repeats the comparison; this time, however, comparing the input value with the high reference limit. The output of the comparator is then indicative of whether the input value is equal or greater than or less than the high reference value. An output device connected to the comparator provides an output indicative of whether the input value is within the high and low reference values, or rather the input value is equal to or higher than the high reference value, or whether the input value is equal to or lower than the low reference value.

An alternative form of the invention provides a plurality of predetermined reference levels which are compared with the input value in automatic sequence. The output of this instrument indicates which pair of reference levels the input value is between, or whether the input is below the lowest reference value or above the highest reference value.

A more thorough understanding of the invention may be obtained by the following detailed description taken in connection with the accompanying drawings in which.

*The system as a whole*

Figure 1:
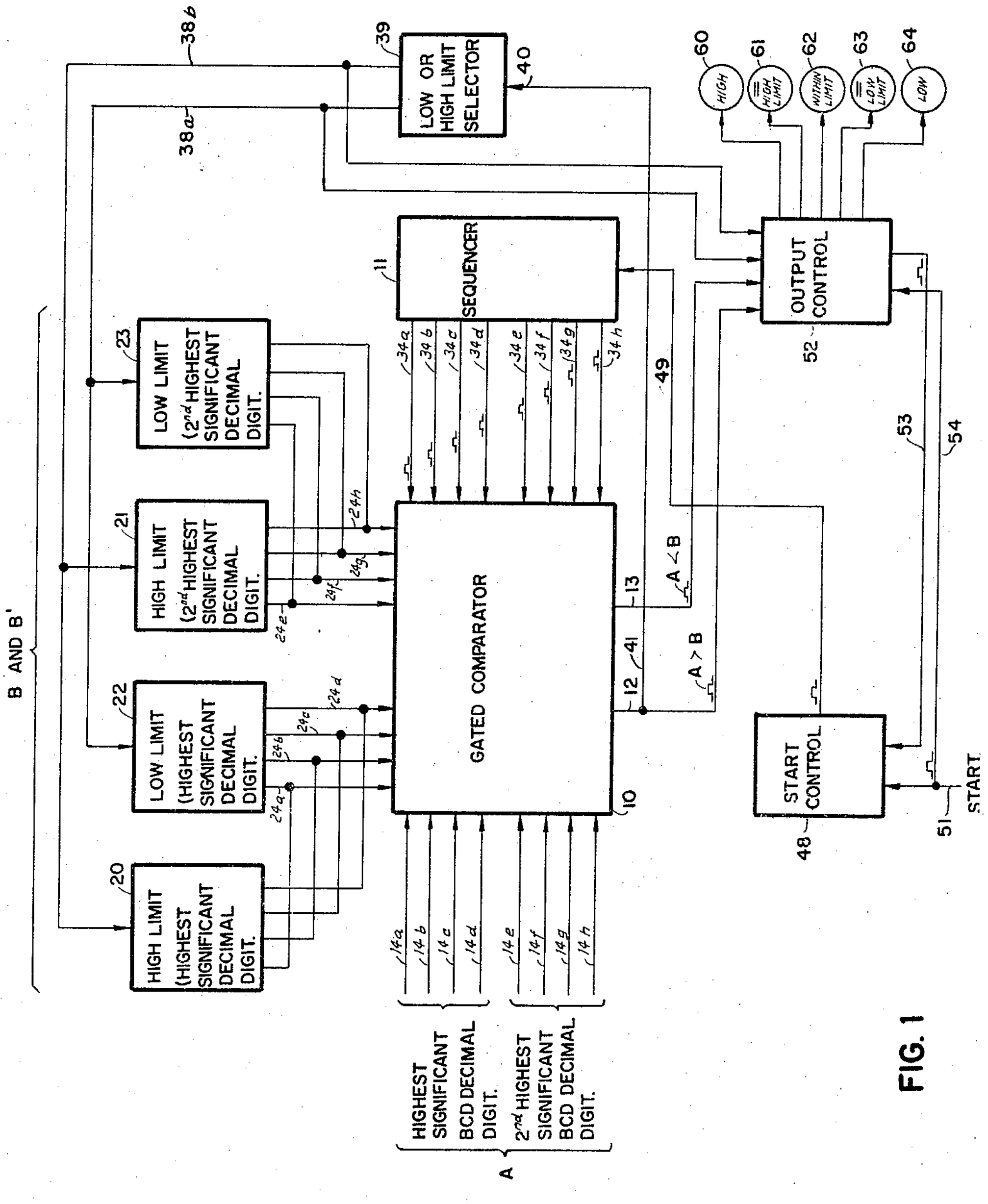
FIG. 1 is a simplified block diagram of a digital comparator constructed in accordance with the present invention.
Figure 2:
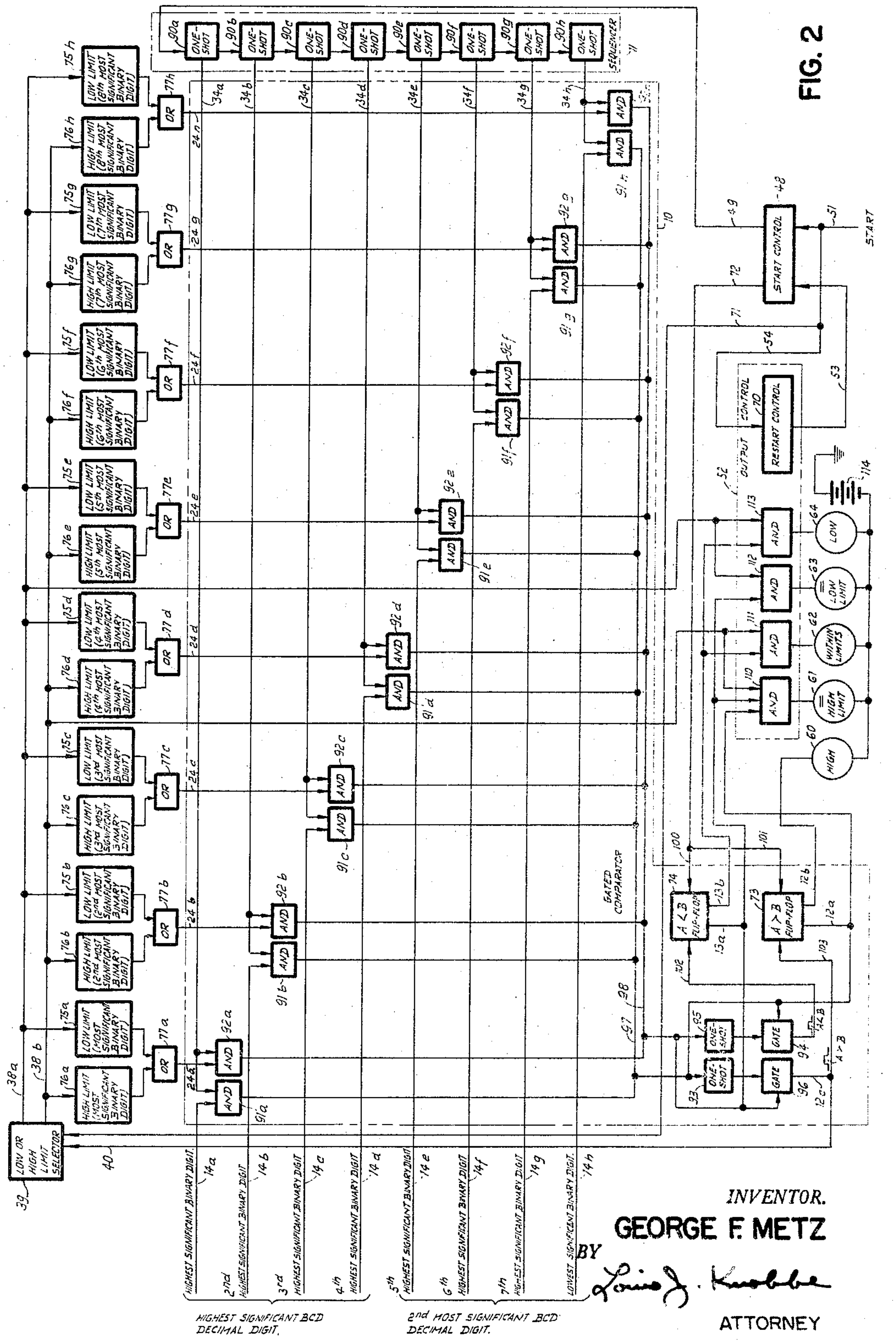
FIG. 2 is a detailed block diagram of a digital comparator constructed in accordance with the present invention.

Referring now to FIG. 1, there is shown a gated comparator 10 which accepts an input signal A, a low reference limit signal B or a high reference limit signal B′, and a plurality of time sequenced control pulses from the output of sequencer 11. The gated comparator 10 includes respective output lines 12 and 13. A pulse or voltage change on output line 12 indicates that A is greater than B or B′ depending upon whether the low or high reference limits are being applied to the gated comparator. A pulse or voltage change on output line 13 indicates that A is less than B or B′ depending upon which of the limit levels are being applied. By way of example only, the digital comparator illustrated in FIG. 1 and also in FIG. 2 is adapted for receiving and comparing inputs encoded in a predetermined binary coded decimal code having a length of two decimal digits or eight binary digits. It will be obvious that digital comparators may be constructed in accordance with the present invention for operation with input data encoded in any logically weighted binary code. Likewise, it will be apparent that such comparators may be constructed for accepting input values having any number of binary digits, an increased number of binary digits serving only to increase the required number of components in the gated comparator, sequencer and the high and low reference limit portions of the comparator.

As shown in FIG. 1, input A includes four binary digits entered on respective input lines 14*a*, 14*b*, 14*c* and 14*d* which comprise the highest significant binary coded decimal digit and four binary digits entered on respective line 14*e*, 14*f*, 14*g* and 14*h* which comprise the second highest significant binary coded decimal digit. The reference limit source includes high limit reference (B′) sources 20, 21 and low limit reference (B) sources 22, 23 into which may be preset the respective highest and second highest significant decimal digit values. The binary digits corresponding to the highest significant decimal digit for the high and low reference limits are supplied to the gated comparator via respective reference limit lines 24*a* 24*b*, 24*c* and 24*d*. The binary digits corresponding to the second highest decimal digit for the high and low reference limits are supplied to the gated comparator via respective reference limit lines 24*e*, 24*f*, 24*g* and 24*h*. The output voltage levels supplied conductors 38*a* and 38*b* by the low or high limit selector 39 determine whether the low reference limit value B or the high reference limit value B′ is applied to the gated comparator via the several reference limit lines 24*a*–24*h*. An input 40 of the low or high limit selector 39 is responsively connected to the output 12 of the gated comparator via conductor 41.

The sequencer 11 generates a plurality of sequence control pulses occurring in time sequence. These pulses are supplied to the gated comparator 10 via respective sequencer lines 34*a*, 34*b*, 34*c*, 34*d*, 34*e*, 34*f*, 34*g* and 34*h* in response to a pulse input supplied from the start control 48 via conductor 49.

The start control 48 responds to a start signal supplied on start line 51, via conductor 54. Also responding to the start signal is output control 52 which is connected thereto. The output control is also connected to the start control via restart line 53 for retriggering the start control at the end of each initial comparison sequence, as described more in detail hereinafter.

Readout lamps 60, 61, 62, 63 and 64 are connected to the output control device 52 for indicating the relationship between the input number A and the predetermined reference limit values B and B′. Thus, the energization of lamp 60 labeled "HIGH" signifies that the input number A is greater than the high reference limit B′ whereas the energization of lamp 64 labeled "LOW" signifies that the input number A is less than the low reference limit B. In similar manner, lamps 61, 62 and 63 respectively labeled "=HIGH LIMIT," "WITHIN LIMITS" and "=LOW LIMIT" signify respectively that A equals B′, A is between B and B′ and A equal B. The necessary information for suitably energizing these lamps is derived from the respective outputs 12 and 13 of the gated comparator 10 and the respective outputs 38*a*, 38*b* of the low or high limit selector 39.

*A general description of the system operation*

The operation of the comparison system shown in FIG. 1 is as follows: An input signal on start line 51 energizes the start control 48. As a result, the sequencer 11 and the gated comparator 10 initially compare the input number A with the low limit number B bit by bit, starting with the highest order binary digit and sequentially comparing corresponding binary digits until a dissimilarity between bits is reached. In addition to determining the dissimilarity between the bits, the gated comparator also determines which of the bits is a binary "1" and which is a binary "0" thereby determining which of the two numbers A or B is greater. If A is less than B, a pulse is supplied on the output line 13 of the gated comparator 10. This pulse is applied to the output control 52 which selectively energizes the LOW lamp 64. If A equals B, no pulses are supplied on either of the output lines 12 and 13. The output control then selectively energizes the "=LOW LIMIT" lamp 63. If A is greater than B, a pulse is supplied on the output line 12 of the gated comparator. This pulse causes the low or high limit selector 39 to reverse the voltage levels supplied respective conductors 38*a* and 38*b* thereby removing the low limit B from the gated comparator and substituting the high limit B′ therefor. A pulse from the output control 52 on restart line 53 then energizes the start control 48 for making a second comparison sequence between the input A and the high limit number B′. Again the gated comparator compares the input number with the limit number bit by bit starting with the highest order binary digit and sequentially comparing corresponding digits until a dissimilarity between bits is reached. An output pulse is supplied from the gated comparator on output line 12 if A is greater than B′ and on output line 13 if A is less than B′. These pulses are supplied to the output control 48 which selectively energizes the "HIGH" lamp 60 if A is greater than B′ and the "WITHIN LIMITS" lamp 62 if A is less than B′. If no signal appears on either output 12 or 13, the output control enables the "=LOW LIMIT" lamp to be energized.

*A numerical example*

By way of illustration only, an example using actual numerical values is given to further facilitate the understanding of the present invention. Thus, assume that the input number A is encoded in the binary coded decimal 4–2–2*–1 code. As will be apparent from the succeeding description, any logical binary code may be utilized; moreover, the codes may be changed as desired, the only requirement being that the input number A and reference limit numbers B and B′ have a common code for a given comparison. If A has, for example, the decimal value 84, its binary coded decimal 4–2–2*–1 value is 1110 0110. Accordingly, signals indicative of binary "1's" are supplied input lines 14*a*, 14*b*, 14*c*, 14*f* and 14*g* and signals indicative of binary "0's" are supplied input lines 14*d*, 14*e* and 14*h*. If, for example, the decimal value of the lower limit B is 65 and the decimal value of the high limit B′ is 75, their respective binary coded decimal values are 1100 0111 and 1101 0111. Accordingly, at the beginning of a comparison sequence, low limit sources 22 and 23 supply signals indicative of binary "1's" to reference limit lines 24*a*, 24*b*, 24*f*, 24*g* and 24*h* and signals indicative of binary "0's" to reference limit lines 24*c*, 24*d* and 24*e*. At the start of a comparison sequence, upon receipt of a start pulse from the start control 48, the sequencer 11 supplies a sequence control pulse upon conductor 34*a* for closing gates within the gated comparator which are coupled to input line 14*a* and reference limit line 24*a*. Signals supplied upon these lines indicate the value of the highest binary digit in the input number A and the limit number B. For the given numerical example, each of the conductors is supplied with a binary "1"; therefore, no output is supplied by the gated comparator since the comparator 10 indicates only a dissimilarity between input and limit bits. At the end of the sequence control pulse on sequence line 34*a*, the closed comparator gates are opened and a succeeding sequence control pulse on conductor 34*b* then closes gates within the gated comparator 10 so as to allow the binary bit on input line 14*b* to be compared with the binary bit on reference limit line 24*b*. Again, since each of these condutcors is supplied with a binary "1" for the example given, no output pulse is supplied by the gated comparator 10. At the end of the control sequence pulse on conductor 34*b*, the closed gates within the gated comparator are opened. Gates connected to the input line 14*c* and reference limit line 24*c* are then closed by a sequence control pulse on conductor 34*c* thereby enabling a comparison between the third highest binary digits of the input and limit members. For the selected example, the third highest binary digit of the input number A is a binary "1" whereas the third highest binary digit of the low limit number B is a binary "0." This dissimilarity in bits is detected by the gated comparator which supplies an output pulse or voltage change on output 12 indicative that A is greater than B. This pulse or voltage change drives the low or high limit selector 39 thereby de-energizing the low limit reference sources 22 and 23 and energizing the high limit reference sources 20 and 21.

At the end of the first comparison sequence between input number A and reference limit number B, and output pulse is supplied by the output control 52 to the start control via restart line 53. The sequencer 11 is then reenergized so as to initially connect input line 14*a* and reference limit line 24*a* to the comparator element within the gated comparator 10. The exact sequence as before is then repeated except that this time the high reference limit number B′ is applied to the gated comparator, i.e., for the example given wherein B′ has a decimal value of 75, signals indicative of binary "1's" are supplied reference limit lines 24*a*, 24*b*, 24*d*, 24*g* and 24*h* and signals indicative of binary "0's" are supplied reference limit lines 24c and 24e. Since the first and second highest significant binary digits of the input number A and the limit number B' are identical, no outputs are supplied at the gated comparator outputs. However, the third highest significant binary digit of the input number A is a binary "1" whereas the third highest significant binary digit of the limit number B' is a binary "0." Accordingly, a pulse or voltage change is supplied at output 12 of the gated comparator indicative that A is greater than B'. This output and the output of the low or high limit selector 39 provides the required information to the output control 52 for selecting "HIGH" lamp 60 which indicates, when energized, that the input number A having a decimal value of 84 is greater than either a low limit B having a decimal value of 65 or a high limit B' having a decimal value of 75.

*An additional numerical example*

By way of further illustration, assume that the value of the input number A is 70 (or 1101 0000 in binary coded decimal 4–2–2*–1 code). The initial comparison is then as with the preceding example wherein A had a decimal value of 84, i.e., the gated comparator indicates that the new A is greater than a low reference number B having a decimal value of 65 thereby causing the low or high limit selector 39 to energize the high limit sources 20 and 21. The high reference number B' having a decimal value of 75 is then supplied the gated comparator. In the second comparison, no output is supplied by the gated comparator for the first five binary digits since the respective first, second, third, fourth and fifth significant binary digits of the input number A and the limit number B' are identical. However, the sixth significant binary digit of the input number A appearing on line 14f is a binary "0" whereas the sixth significant binary digit of the limit number B' appearing on reference limit line 24f is a binary "1." The gated comparator indicates that A is less than B' by supplying a signal at output 13. This signal is supplied to the output control 52 which energizes the "WITHIN LIMITS" lamp thereby providing an indication that the input number A having a decimal value of 70 is within the designated low and high limits B and B' having the decimal values of 65 and 75 respetcively.

*A detailed description of the system*

FIG. 2 shows a detailed schematic of the digital comparator heretofore described and illustrated in FIG. 1. Those elements which may be identical to elements shown in FIG. 1 bear the same reference numerals. The operation and structure of the comparator illustrated in FIG. 2 is as follows: Initially, a start signal on start line 51 triggers start control 48, triggers restart control 70 within output control 52 via conductor 54, and resets, if necessary, low or high limit selector 39 via first reset line 71.

*The start control*

Start control 48 and restart control 70 may comprise, for example, respective one-shot or single-cycle multivibrators. A number of different circuits employing vacuum tubes, transistors and like devices are known in the art for constructing this type of multivibrator. When triggered by an input signal, such a multivibrator goes through a single cycle of operation, returning to its initial state at the end of a predetermined time period. This circuit is used herein as the start control 48 to provide a second reset pulse on second reset line 72 at the beginning of its cycle of operation to reset, if necessary, the "*A*>*B*" flip-flop 73 and the "*A*<*B*" flip-flop 74. At the end of its cycle of operation, a start pulse is applied upon conductor 49 to the sequencer 11. Ordinarily, the start control 48 has a very brief cycle of operation, a representative period being 25 microseconds. The slightly delayed start pulse insures that flip-flops 73 and 74 are in their reset state prior to the generator of the first sequence control pulse by sequencer 11. Also, the delayed start pulse enables any capacitive circuitry to charge, e.g. R-C gates in the gated comparator 10. If no delay is required for the start pulse, it will be apparent that the second reset pulse on second reset line 72 may be also utilized as the start pulse.

*The low or high selector*

Selector 39 may comprise a bistable flip-flop stage having a pair of mutually exclusive outputs. This stage may be constructed in any one of the numerous ways presently known in the art. A representative circuit, for example, incorporates a pair of transistors so cross-coupled that they are retained in mutually exclusive states of conduction and nonconduction. The two states of the transistor are reflected in different potential levels on the conductors 38a and 38b. For example, one conductor may be energized at a ground or positive potential and the other conductor energized at a negative potential. A start signal applied to the first reset line 71 causes the binary to either return to or remain in, as the case may be, the state wherein ground potential is applied conductor 38a and negative potential is applied to conductor 38b. A signal applied to the other input 40 of the selector 39 triggers the flip-flop into its opposite state wherein negative potential is applied conductor 38a and ground potential to conductor 38b.

*The reference limit sources*

The outputs of the selector 39 are connected to respective binary reference limit sources; thus, conductor 38a is connected to each of the low limit binary reference sources 75a, 75b, 75c, 75d, 75e, 75f, 75g and 75h whereas conductor 38b is connected to each of the high limit binary reference sources 76a, 76b, 76c, 76d, 76e, 76f, 76g and 76h. Low limit binary source 75a presets the value of the highest significant binary digit of the low limit number B; low limit binary source 75b presets the value of the second highest significant binary digit of the low limit number B, etc. High limit binary source 76a presets the value of the highest significant binary digit of the high limit number B'; high limit binary source 76b presets the value of the second highest significant binary digit of the high limit number B', etc. The outputs of each pair of corresponding high and low binary sources are connected to inputs of common OR gates 77a, 77b, 77c, 77d, 77e, 77f, 77g and 77h. Thus, the outputs of sources 75a and 76a are connected to inputs of common OR gate 77a. The output of OR gate 77a comprises reference limit line 24a. In like manner, the outputs of the other OR gates comprise respective reference limit lines 24b, 24c, 24d, 24e, 24f, 24g and 24h as shown.

Figure 3:
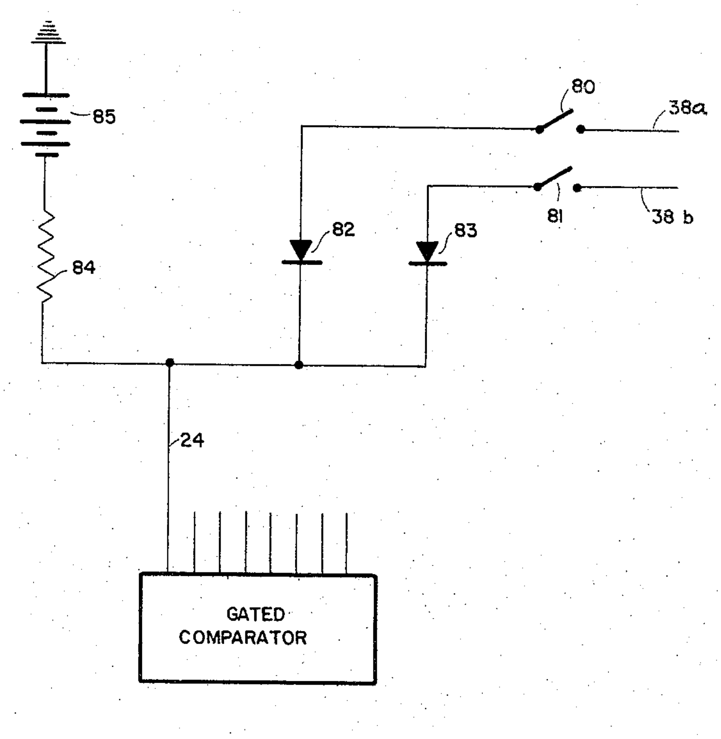
FIG. 3 is a circuit schematic of a reference limit source.

The circuitry of a representative high and low binary source and OR gate combination is shown in FIG. 3. In this circuit and also the system shown in FIG. 2, a ground or positive potential represents a binary "1" and a negative potential represents a binary "0." Low and high binary sources 75 and 76 include respective selector switches 80 and 81 which are opened for selecting a binary "0" and closed for selecting a binary "1." One contact of low limit selector switch 80 is connected to conductor 38a and the other contact is connected to the anode of diode 82. Similarly, one contact of high limit selector switch is connected to conductor 38b and the other contact is connected to the anode of diode 83. The cathodes of diodes 82 and 83 are connected together to reference limit line 24 and one terminal of resistor 84. The other terminal of resistor 84 is connected to a negative potential source 85.

The circuit of FIG. 3 operates as follows: When both switches 80 and 81 are open, a signal indicative of a binary "0" is supplied limit line 24 by source 85. With selector 39 supplying ground potential to conductor 38a and negative potential to conductor 38b it will be apparent that the particular state of high limit selector switch 81 has no effect on reference limit line 24 since line 24 is held at a negative potential by source 85 regardless of whether switch 81 is open or closed (assuming low limit switch 80 is open). However, if switch 80 is closed, the ground potential on conductor 38*a* raises the cathode of diode 82 to approximately ground potential thereby grounding limit line 24. Resistor 84 prevents source 85 from being shorted. Thus, limit line is supplied with a signal indicative of a binary "1" when switch 80 is closed and with a signal indicative of a binary "0" when switch 80 is open. It will be apparent that the reverse operation occurs when a signal at input 40 of selector 39 causes selector 39 to reverse the respective potentials on conductors 38*a* and 38*b*. Low limit switch 80 is then no longer effective to vary the signal on limit line 24 whereas high limit switch 81 when closed applies a ground potential to line 24. Diodes 82 and 83 function as OR gate 77 effectively isolating the high limit source from the low limit source. With each pair of associated low limit and high limit sources constructed as in FIG. 3, it will be apparent that each binary digit of both the low and high reference numbers B and B′ may be preselected by opening those selector switches representing binary "0's" and closing those representing binary "1's." This is so regardless of the particular binary code being used.

*Sequencer*

As shown in FIG. 2 sequencer 11 may comprise a plurality of cascaded one-shot multivibrators 90*a*, 90*b*, 90*c*, 90*d*, 90*e*, 90*f*, 90*g* and 90*h* each being designed to have a relatively short operation cycle, e.g. 25 microseconds. Upon receipt of the start pulse from the start control 48, the first one-shot multivibrator stage 90*a* is caused to trigger and supply the initial 25 microsecond pulse output on conductor 34*a*. At the termination of the initial pulse, a trigger pulse from one-shot 90*a* triggers the succeeding one-shot 90*b* which supplies a sequence control pulse upon conductor 34*b*. In like manner, succeeding sequence control pulses are generated by one-shots 90*c*–90*h*.

*The gate circuitry within the gated comparator*

The gate circuitry of gated comparator may comprise, as shown, a plurality of AND gate pairs 91*a*, 92*a* through 91*h*, 92*h*. Each of the AND gates 91*a*–91*h* are responsive to simultaneous occurring binary "1" signals on a respective one of the input lines 14*a*–14*h* and sequence control pulses on a respective one of the sequence conducting lines 34*a*–34*h*. Each of the AND gates 92*a*–92*h* are responsive to simultaneous binary "1" signals on a respective one of the reference limit lines 24*a*–24*h* and sequence control pulses on a respective one of the sequence conducting lines 34*a*–34*h*. The outputs of each of the AND gates 91*a*–91*h* are connected to conductor 97 and hence to the input of one-shot multivibrator 93 and the control input of the inhibit gate 94 in the comparator portion of the gated comparator 10. Each of the outputs of the AND gates 92*a*–92*h* are connected to conductor 98 and hence to the input of one-shot multivibrator 95 and the control input of the inhibit gate 96 which are also located in the comparator portion of the gated comparator.

The operation of the gated comparator is as follows: The initial sequencing control pulse on conductor 34*a* enables the respective AND gates 91*a* and 92*a* to pass binary "1" inputs appearing at their respective other inputs 14*a* and 24*a*. By way of illustration, if the input number A has a decimal value of 84 (or 1110 0110 in binary decimal 4–2–2*–1 code) input line 14*a* is supplied with a binary "1" which is gated through AND gate 91*a*. Also, if the low reference limit number B has a decimal value of 65 (or 1100 0111) reference limit line 24*a* supplied with a binary "1" which is gated through AND gate 92*a*. Accordingly, simultaneous binary "1" signals are applied one-shots 93 and 95 and inhibit gates 94 and 96.

*The comparator circuitry within the gated comparator*

Inhibit gates 94 and 96 are designed to open and prevent the passage of signals therethrough in response to a binary "1" input at their control inputs. It will thus be evident that if binary "1's" appear simultaneously at the outputs of a pair of AND gates such as AND gates 91*a* and 92*a*, both of the gates 94 and 96 will be opened whereas if a binary "1" is supplied conductor 97 from one of hte input lines whereas a binary "0" is supplied conductor 98 by one of the reference limit lines, inhibit gate 96 will not be opened thereby allowing the output of the one-shot multivibrator 93 to be supplied to the input of the flip-flop 73 via conductor 12*c*. This condition occurs if the input signal A is greater than the limit B; accordingly, a pulse at the output of inhibit gate 96 indicates that A is greater than B ($A>B$). Contrariwise, if a binary "0" is supplied conductor 97 from one of the input lines whereas a binary "0" is supplied conductor 98 by one of the reference limit lines, inhibit gate 94 remains closed so as to allow the output of the one shot multivibrator 95 to be supplied to the input of the flip-flop 74. This condition occurs whenever the input signal A is less than the limit value B; accordingly, a pulse at the output of inhibit gate 94 indicates that A is less than B ($A<B$).

The $A>B$ flip-flop 73 and the $A<B$ flip-flop 74 have respective reset inputs 100, 101 and respective trigger inputs 102, 103. Each of these flip-flops are designed so that when reset, succeeding reset pulses do not affect the state thereof and when triggered, succeeding trigger pulses do not affect the state thereof. The $A>B$ flip-flop 73 includes a pair of outputs 12*b*, 12*c* which are maintained in mutually exclusive states of respectively negative and ground potentials in the reset state. Similarly, the $A<B$ flip-flop 74 includes respective outputs 13*a*, 13*b* which are maintained respectively at negative and ground potentials when flip-flop 74 is in its reset state. Output 12*a* of flip-flop 73 is connected to the control input of inhibit gate 94 and output 13*a* of flip-flop 74 is connected to the control input of inhibit gate 96. Thus, flip-flop 73 applies a binary "0" to the control input of inhibit gate when in its reset state and a binary "1" thereto when in its triggered state. Similarly, flip-flop 74 in its reset state applies a binary "0" to the control input of inhibit gate 96 and in its trigger state applies a binary "1" to the control input of inhibit gate 96. Accordingly, if a signal through gate 96 is received at the trigger input 103 of flip-flop 73, a binary "1" from its output 12*a* causes gate 94 to open thereby preventing any pulses from being transmitted therethrough to the $A<B$ flip-flop 74. Similarly, if a signal through gate 94 is received at the trigger input 102 of flip-flop 74, a binary "1" from its output 13*a* causes gate 96 to open thereby preventing any pulses from being transmited therethrough to the $A>B$ flip-flop 73. The circuitry just described allows only the first and most significant difference in binary digits to affect the flip-flops 73 and 74 since any succeeding dissimilar binary inputs are prevented by one or the other of the inhibit gates from affecting the flip-flop states. Thus, by way of example, if the input number has a decimal value of 84 and the low and high reference limits have respectively the decimal value of 65 and 75, the comparator circuitry will detect that the third highest significant digit of the input and low reference limit number are dissimilar, the third binary coded 4–2–2*–1 digit of 85 being a binary "1" whereas the third highest binary coded 4–2–2*–1 digit of 65 being a binary "0." This dissimilarity is detected when a sequencing control pulse on conductor 34*c* enables AND gates 91*c* and 92*c* which cause the $A>B$ flip-flop 73 to trigger. As a result, gate 94 opens. Accordingly, although the sequencing control pulse on the conductor 34*h* will establish different binary signals on conductors 97 and 98 because of the dissimilarity in bits between the eighth or last significant binary digits of the input number A and the low limit number B, this dissimilarity fails to trigger the $A<B$ flip-flop 74. If, for example, the input number A had a decimal value of 88 (or a binary coded 4–2–2*–1 code of 1110 1110) the dissimilarity of the fifth highest significant binary digit of the input number and the limit number merely applies a triggering pulse to the already triggered $A>B$ flip-flop 73. Since trigger input 103 as well as trigger input 102 of the flip-flops are designed to trigger the respective flip-flops only when in their respectively reset state; second, third or any number of succeeding trigger pulses are ineffectual for changing the states of the flip-flops.

*The restart control*

A short time after the final sequence control pulse is supplied by the sequencer 11 over conductor 34*h*, an output pulse is supplied at the output of restart control 70 via restart line 53 to re-energize the start control 48. This function may be provided by utilizing a one-shot multivibrator stage having a cycle of operation longer than the sequencer 11 as the start control 70. By way of example, if the eight one-shots of sequencer 11 have a 25 microsecond operation cycle, the restart control 70 should have a cycle somewhat greater than 200 microseconds. The actuation of the start control 48 causes the $A>B$ and the $A<B$ flip-flops 73 and 74 to be reset and the sequencer 11 to begin another sequence of successive sequence control pulse outputs. If neither of the flip-flops 73 and 74 or only the $A<B$ flip-flop 74 were triggered in the preceding comparison sequence, the succeeding comparison sequence is identical to the one preceding, the input number A being recompared with the low limit B. However, if the $A>B$ flip-flop 73 was triggered in the preceding comparison sequence, the potential levels supplied by the selector 39 are respectively opposite so that the high limit sources are energized in the manner described hereinabove. Accordingly, the input number A is then compared with the high limit number B′. After the second comparison, the device comes to a stop until the next start signal is received on start line 51.

*The output control and indicator lamps*

Output control 52 comprises four logical AND gates 110, 111, 112 and 113 for selectively energizing four of the five output indicator lamps. As shown, each of the indicator lamps 60–64 are connected to one terminal of a negative potential source 114 approximately equal to the voltage of a binary "0" signal. Only one lamp will be energized at the end of each comparison sequence since only one lamp will be connected to ground or positive potential indicative of a binary "1," the remaining lamps being connected to a binary "0" negative potential which sufficiently reduces the potential applied across the lamp so as to prevent energization thereof.

"LOW" lamp 64 is energized whenever simultaneous binary "1" signals are applied to AND gate 113 by output 13*b* of the $A<B$ flip-flop 74 and by conductor 38*a*. This condition prevails when the selector 39 energizes the low limit sources and the $A<B$ flip-flop 74 has been triggered by an output signal indicative that A is less than the low reference number B. The "=LOW LIMIT" lamp 63 is energized whenever simultaneous binary "1" signals are applied to AND gate 112 by output 13*a* of the $A<B$ flip-flop 74 and by conductor 38*a*. This condition is present when the selector 39 applies a ground potential or binary "1" signal on conductor 38*a* for energizing the low limit sources and the $A<B$ flip-flop 74 is in its reset state. The "WITHIN LIMITS" lamp 62 is selectively energized when simultaneous binary "1" inputs are applied to AND gate 111 from conductor 38*b* and output 13*b* of the $A<B$ flip-flop 74. This condition occurs when A is indicated as being less than the high reference number B′. Since the selector 39 only energizes the high limit if a previous comparison indicated that A was greater than the low reference number B, it is apparent that lamp 62 is properly energized for indicating that the input number A is between B and B′. The "=HIGH LIMIT" lamp 61 is energized when simultaneous binary "1" signals are applied to AND gate 110 from conductor 38*b*, output 13*a* of the $A<B$ flip-flop 74 and output 12*a* of the $A>B$ flip-flop 73. This condition prevails when neither of the flip-flops have been energized and the selector energizes the high limit reference sources. Thus, lamp 61 is selected only after the second comparison has indicated that no dissimilarity exists between the input number A and the high limit reference B′. The "HIGH" lamp 60 is energized by a binary "1" signal appearing at the output 12*a* of the $A>B$ flip-flop 73. Although it may appear that lamp 60 may be erroneously energized during the first comparison sequence since the $A>B$ flip-flop 73 may then be triggered if A is greater than the low limit reference B, the period of time for a complete comparison operation is so short that an insufficient time is allowed for any lamps to be energized prior to the termination of a comparison sequence. Thus, a representative comparator constructed according to the present invention employing a 7 decimal digit, 28 binary digit input requires approximately 5 milliseconds for each sequence operation or 10 milliseconds for a complete comparison with both the low and high reference numbers B and B′. This brief period of time is ordinarily insufficient to energize an output indicator lamp. It will, of course, be apparent that additional circuitry may be incorporated in the output control for preventing any other lamps from being energized prior to the termination of a comparison sequence. For example, a second one-shot multivibrator having a cycle of operation just slightly longer than the time necessary to complete both comparison sequences may be connected to the lamps 60–64 for preventing them from turning on until after a complete comparison with both the high and low reference numbers.

*An alternative embodiment providing a plurality of reference limits*

Figure 4:
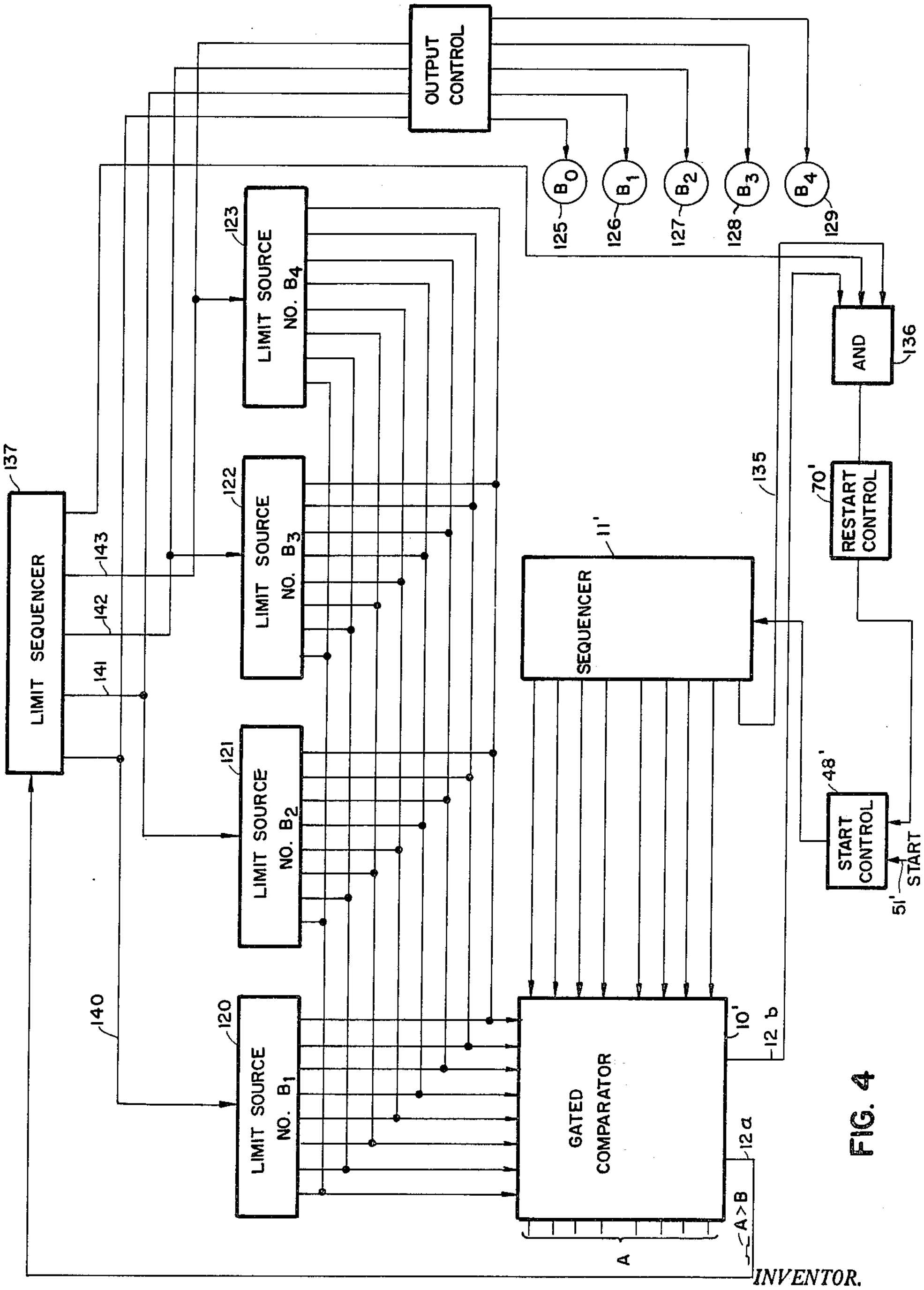
FIG. 4 illustrates in block diagram form an alternative embodiment of the present invention.

In FIG. 4, there is shown an alternative embodiment of the present invention in which an input number A may be compared with a plurality of reference limits. By way of example only, the system shown in FIG. 4 provides four limit sources 120, 121, 122 and 123 respectively adapted for generating limit references $B_1$, $B_2$, $B_3$ and $B_4$. The input number A is compared sequentially with each of these limit numbers starting with the lowest limit number and proceeding sequentially to the highest until a limit number B is found which is greater than the input number A. The next lower limit is then indicated as a comparison result by selectively energizing one of the respective output indicator lamps 125, 126, 127, 128 and 129 respectively labeled $B_0$, $B_1$, $B_2$, $B_3$ and $B_4$. For example, if the input number A is equal to or less than $B_2$, the $B_1$ lamp is selectively energized thus indicating that the input number A is greater than limit $B_1$, possibly equal to $B_2$, but definitely is not greater than the limit number $B_2$.

The structure and function of the system shown in FIG. 4 is as follows: Gated comparator 10′ may be identical in structure and function to the circuitry shown in FIG. 2. The plurality of input lines respectively equal in number to the number of binary bits in the input number A are connected as inputs to the gated comparator as well as a number of limit lines equal in number to the number of binary bits in the limit number B. By way of example only, the input number A and the limit number B are shown as having eight binary digits. It will, however, be apparent that fewer or greater bits may be added in a manner desribed in relation to FIG.

2. Also connected as inputs to the gated comparator 10′ are eight sequence control lines coupled to sequencer 11′. Sequencer 11′ may also be identical in structure to the sequencer shown in FIG. 1 with one modification, namely, that a final sequence control pulse is generated after the first eight control pulses have been supplied the gated comparator. This pulse is supplied via conductor 135 to an input of AND gate 136.

The particular limit source which is energized is determined by the limit sequencer 137 which includes outputs 140, 141, 142 and 143 which are respectively connected to limit source $B_1$, limit source $B_2$, limit source $B_3$ and limit source $B_4$. An additional output 144 of the limit sequencer is connected to an input of AND gate 136. Limit sequencer 137 is caused to energize successive limit sources in response to signals at output **12*a*′ of the gated comparator 10′**, such signals being indicative that the input number A is greater than the particular limit B which is being compared.

In operation, a start signal on input line 51′ energizes the start control 48′. As in the previous embodiment, start control 48′ provides a delay before actuating sequencer 11′. The input number A is sequentially compared bit by bit with the limit $B_1$. If no signal appears on output **12*a*′ of the gated comparator indicating that the input number A is greater than the reference, the output control 145 selectively energizes the $B_0$ lamp 125. If, on the other hand, a dissimilarity in bits is noted by the gated comparator by a change in potential on outputs 12*a* and 12*b*, the signal on output 12*a*′ causes limit sequencer 137 to apply the next limit source $B_2$ to the reference limit lines of the gated comparator 10′. Potentials supplied from output 12*b* of the gated comparator and output 144 of the limit sequencer enable the AND gate 136 to pass the final sequencer control pulse on conductor 135 for energizing restart control 70′. The restart signal generated by this element re-energizes start control 48′ and so initiates a succeeding comparison sequence. The comparison is then repeated until either no change in potential is observed on outputs 12*a*′, 12*b*′ of the gated comparator 10′ or the final limit source $B_4$ has been compared with the input A. In the former instance, the potential on output 12*b*′ is such as to block AND gate 136. In the latter instance, the potential on output 144 of the limit sequencer changes so as to block AND gate 136. The instrument comparison cycle then stops until another start signal is applied to start line 51**.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. A digital comparator for comparing a binary coded input signal with a pair of coded reference limit signals comprising a first limit means for presetting the value of each binary digit of one of said limit signals; a second limit means for presetting the value of each binary digit of the other of said limit signals; gating means including a plurality of first and second AND gate pairs corresponding to the number of binary digits of said input and said limit signals, means connecting signals corresponding to the binary digits of said input signal in parallel to respective ones of said first AND gates, means for selectively connecting signals corresponding to the binary digits of said first limit means or said second limit means in parallel through respective common lines to respective ones of said second AND gates, first conductor means connected to each of the outputs of said first AND gates, second conductor means connected to each of the outputs of said second AND gates, and sequencer means coupled to said AND gate pairs for sequentially enabling said AND gate pairs so that said first and second conductors sequentially provide signals corresponding to the binary digits of said input and selected reference limit signals; comparison means coupled to said first and second conductor means for detecting a dissimilarity between corresponding digits of the input signal and the selected limit signal, said comparison means comprising first and second inhibit means each having a signal input, a signal output, and a control input for inhibiting conduction between said signal input and output, means connecting the signal input of said first inhibit means and the control input of said second inhibit means to said first conductor means, means connecting the signal input of said second inhibit means and the control input of said first inhibit means to said second conductor means so that no output signal is provided by either of said inhibit means when like binary values are gated by said gating means to said first and second conductor means, an output signal is provided by the first inhibit means if a first value binary digit of the input signal is gated simultaneously with a second value binary digit of the selected limit signal, and an output signal is provided by the second inhibit means if a second value binary digit of said input signal is gated simultaneously with a first value binary digit of the selected limit signal.

2. The digital comparator defined in claim 1 comprising a first bistable flip-flop means having first and second mutually exclusive outputs responsively connected to the output of said first inhibit means so that said first bistable flip-flop means is triggered if the input signal is greater than the selected limit signal; a second bistable flip-flop means having first and second mutually exclusive outputs responsively connected to the output of said second inhibit means so that said second bistable flip-flop means is triggered if the input signal is less than the selected limit signal; means connecting the output of said first inhibit means to the input of said selector means; and means connecting the outputs of said first and second bistable flip-flop means and the output of said selector means to said output indicating means.

3. The digital comparator defined in claim 2 comprising means connecting one of the outputs of said first bistable flip-flop means to the control input of said second inhibit means so that said second bistable flip-flop means cannot be triggered subsequent to the triggering of said first bistable flip-flop means; and means connecting one of the outputs of said second bistable flip-flop means to the control input of said first inhibit means so that said first bistable flip-flop means cannot be triggered subsequent to the triggering of said second bistable flip-flop means.

4. The digital comparator defined in claim 3 wherein said output indicating means comprises first AND gate means responsively connected to the first output of said selector means and to the second output of said second flip-flop means; a second AND gate means responsive to the first output of said selector means and the first output of said second flip-flop means; a third AND gate responsive to the second output of said selector means and the second output of said second flip-flop means; a fourth AND gate means responsive to the second output of said selector means, a first output of said second flip-flop means and the first output of said first flip-flop means; first, second, third and fourth indicator means respectively connected to the outputs of said first, second, third and fourth AND gate means; and a fifth indicator means responsively connected to the second output of said first flip-flop means.

5. The digital comparator defined in claim 1 wherein said selector means selectively enabling said first and second limit means, said selector means having a first output for energizing said first limit means and a second output for energizing said second limit means, and wherein said first limit means comprises a plurality of first individual manual switch means which may be selectively preset to a binary "0" or a binary "1" state; said second limit means comprising a plurality of second individual manual switch means which may be selectively preset to a binary "0" or a binary "1" state, said switch means of said first and second limit sources corresponding in number to the binary digits of said first and second limit signals; means for connecting said first switch means to the first output of said selector means; means connecting said second switch means to the second output of said selector means; and means for connecting the high and low limit switches for each binary digit to respective common output lines so that said lines are energized by signals indicative of the binary digits of said low limit when said selector means energizes said first limit means and said output lines are energized by signals indicative of the binary digits of said high limits when said selector means energizes said second limit means.

References Cited by the Examiner

UNITED STATES PATENTS

| | | | |
|---|---|---|---|
| 2,074,392 | 3/37 | Herbst | 340—149 |
| 2,865,567 | 12/58 | Booth et al. | 340—149 |
| 2,900,620 | 8/59 | Johnson | 340—149 |
| 3,017,610 | 1/62 | Auerbach et al. | 340—149 |

MALCOLM A. MORRISON, *Primary Examiner.*

IRVING L. SPRAGOW, *Examiner.*